United States Patent Office 3,480,608
Patented Nov. 25, 1969

3,480,608
POLYMERIZATION OF 1,3-BUTADIENE
Rudolf H. Gaeth and Floyd E. Naylor, Bartlesville, Okla., assignors to Phillips Petroleum Company, a corporation of Delaware
No Drawing. Filed Mar. 11, 1966, Ser. No. 533,453
Int. Cl. B01j 11/84; C08f 1/42, 3/16
U.S. Cl. 260—94.3                8 Claims

ABSTRACT OF THE DISCLOSURE

A polymerization process for 1,3-butadiene and a method for controlling the molecular weight and the microstructure of the polybutadiene product are provided by employing a catalyst system which forms on mixing molybdenum pentachloride with a mixture of (1) a reducing component such as lithium aluminum hydride or an organometallic compound and (2) a nickel component selected from the group consisting of metallic nickel having a large surface area for its weight and a reducible nickel compound capable of being reduced by said reducing component.

---

This invention relates to the polymerization of 1,3-butadiene. In another aspect, this invention relates to a novel catalyst system for polymerizing 1,3-butadiene.

Several different catalyst systems are known in the art for the polymerization of 1,3-butadiene. By using certain of these known catalyst systems, it is possible to produce polymers having high cis, high trans, or high vinyl structures. Ordinarily, however, it is not possible to vary the structure of the polymer over a wide range when using a specific stereospecific polymerization catalyst known in the art.

It is an object of this invention to provide a process for the polymerization of butadiene. It is another object of this invention to provide a process for producing polybutadiene having a controlled structural configuration. It is a further object of this invention to provide a novel catalyst for polymerizing 1,3-butadiene.

Other aspects, advantages and objects of this invention will be apparent to those skilled in the art upon studying the accompanying disclosure and claims.

Broadly speaking, we have discovered a process for polymerizing 1,3-butadiene with a catalyst system comprising molybdenum pentachloride and a mixture of a nickel component and an organometallic compound or lithium aluminum hydride. By varying the amount of molybdenum pentachloride in the catalyst system, it is possible to produce polymers ranging from high cis structural configurations to high vinyl structural configurations.

The organometallic compounds and lithium aluminum hydrides that can be used in the process of our invention are compounds having the formula $R_mAlCl_n$,

or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triethylaluminum, triisobutylaluminub, tri-n-eicosylaluminum, triphenylaluminum, methylaluminum sesquichloride, ethylaluminum sequihalide, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl n-butyllithium, 4-tolylaluminum dichloride, diphenyl aluminum chloride, 2 - naphthyllithium, diethylmagnesium, diphenylmagnesium, trimethylgallium, diethylphenylgallium, tribenzylgallium, 4-methylcyclohexyl potassium, benzyllithium, n-eicosyllithium phenylsodium, cyclohexylpotassium, isobutyl rubidium, n-nonyl cesium, diethylberyllium, diphenylberyllium, diethylzinc, dicyclopentylzinc, di-n-propylcadmium, dibenzylcadmium, trimethylindium, triphenylindium, and the like.

The nickel component used in our invention can be metallic nickel having a large surface area for its weight or a reducible nickel compound. When metallic nickel is used it should be in the form of a colloid, fine powder or porous solid such as reduced nickel adhered to carriers or Raney type nickel. The nickel compounds used in this invention are those nickel compounds that are capable of being reduced by the above-described organometallic compounds. In the desired reduction reaction the nickel is reduced to a lower valence state. The desired reduction is accomplished by contacting the nickel compound with the above-described organometallic compound or lithium aluminum hydride. Suitable reducible nickel compounds include nickel oxide, nickel salts of inorganic acids and organic acids, nickel salts of beta-diketones of the formula:

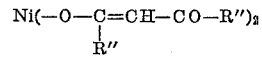

wherein R" is a saturated aliphatic saturated cycloaliphatic or aromatic radical or combination thereof, containing from 1 to 10 carbon atoms, and complex compounds such as dicyclopentadienylnickel, nickel tetracarbonyl, and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the beta-diketones include the nickel salts of 2,4-pentanedione (acetylacetone), 3,5-heptanedione, 1,5-dicyclopentyl-2,4-pentanedione, and the like. Mixtures of the foregoing nickel components can be used.

Nickel compounds that are reduced with the lithium aluminum hydride or the organometallic compounds are preferred in the process of our invention.

It is within the scope of our invention to utilize nickel components that are supported on various carriers such as diatomaceous earth, silica-alumina, silica, alumina, titania, zirconia, kaolin, ion-exchange resins and the like. The metallic nickel or the reducible nickel compound, such as nickel oxides and the like, can be supported on the above-mentioned carriers.

The catalyst compositions used in this invention are formed by combining the lithium aluminum hydride or the organometallic compound and the nickel component prior to introduction of the molybdenum pentachloride. The lithium aluminum hydride or the organometallic compound and the metallic nickel or the nickel compound can be combined in the presence of a hydrocarbon diluent. Suitable hydrocarbon diluents include those that are also suitable as a polymerization diluent. The diluent can be a paraffinic, cycloparaffinic, or aromatic hydrocarbon such as n-pentane, n-hexane, isooctane, cyclohexane, benzene, toluene, and the like. The mixture of the lithium aluminum hydride or the organometallic compound and the nickel component is maintained at a temperature in the range of about 20 to 70° C. for a sufficient length of time to produce an active catalyst component. The aging time is dependent upon the particular compounds used and on the temperature of the reaction. Generally, the aging time will be in the range of about 5 minutes to 25 hours. If a reducible nickel compound is used, it undergoes a reduction type reaction wherein the nickel is reduced to a lower valence state during the aging step.

It has been found that when the concentrations of the lithium aluminum hydride or the organometallic compound and the nickel component are quite low, the aging time may have to be increased slightly. After the desired aging has been achieved, the molybdenum pentachloride catalyst component is added to the polymerization zone and the polymerization reaction is allowed to proceed.

The 1,3-butadiene monomer can be added to the polymerization zone either prior to or after the introduction of the molybdenum pentachloride catalyst component.

The ratio of the nickel component to the lithium aluminum hydride or the organometallic compound is expressed in terms of gram atoms of nickel per gram mole of the lithium aluminum hydride or the organometallic compound. The ratio of the nickel component to the lithium aluminum hydride or the organometallic compound is in the range of 0.25 to 6 gram atoms of nickel per gram mole of lithium aluminum hydride or organometallic compound with from 0.5 to 3 being preferred. The mol ratio of the molybdenum pentachloride to the lithium aluminum hydride or the organometallic compound is in the range of 0.1:1 to 25:1. The preferred mol ratio of molybdenum pentachloride to organometallic compound or lithium aluminum hydride is from 1:1 to 12:1. The total catalyst level in the polymerization system is based on the nickel component and is generally in the range of about 0.25 to 10 milligram atoms of nickel per 100 grams of the monomer. The preferred amount of the nickel component is generally in the range of about 1 to 4 gram atoms of nickel per 100 grams of the monomer.

The polymerization is generally carried out in the presence of a hydrocarbon diluent. Suitable diluents include paraffinic, cycloparaffinic and aromatic hydrocarbons such as n-pentane, n-hexane, isooctane, cyclohexane, benzene, toluene, and the like and mixtures of the above. It is desirable to carry out the polymerization at a pressure such that at least a portion of the 1,3-butadiene monomer is in the liquid phase. The polymerization is usually carried out at a temperature in the range of 0 to 250° F. with a temperature in the range of 50 to 200° F. being preferred.

We have found that at any given mol ratio of the nickel component to the lithium aluminum hydride or the organometallic compound, within the above-described limits, an increase in the molybdenum pentachloride level results in a decrease in the vinyl content, an increase in the cis content, and a decrease in the inherent viscosity of the polybutadiene produced in the polymerization system. While there is some change in the trans content of the polymer products, it is generally of a smaller magnitude than the observed changes in the cis and vinyl content of the polymers. The polymers produced at the higher molybdenum pentachloride levels have a relatively high cis content, high crystallinity and a fairly broad molecular weight distribution. On the other hand, the polymers produced at relatively low levels of the molybdenum pentachloride have relatively high vinyl contents, are amorphous and have a fairly narrow molecular weight distribution. Thus, the process of our invention provides a means for controlling the molecular weight and the microstructure of the polybutadiene product by varying the quantities and mol ratios of the initiator components.

The polymer products produced in accordance with our invention have many properties that make them valuable for a variety of commercial applications. The polymers produced in accordance with our invention which have a high vinyl content can be used in coating compositions, adhesive compositions, and in the manufacture of pressure-sensitive tapes and the like. Polymers having a high cis content can be useful in conventional tire tread and carcass applications either per se or in admixture with other types of synthetic rubbers as well as in blends with natural rubber. The use of cis-polybutadiene in such applications is well known. We have found that the polymer products produced by our invention which have approximately equal amounts of cis and vinyl structure can also be used in such applications as tires, tire carcasses and the like. Such polymers, having approximately equal vinyl and cis contents, have a good balance of modulus, tensile and elongation properties that compare favorably with those of conventional high cis-polybutadienes. However, such polymers have a lower heat build-up than found in conventional high cis-polybutadienes. This property makes them particularly suitable for use in the manufacture of tires and the like. It will be obvious to those skilled in the art that the polymers prepared in accordance with our invention can be compounded and vulcanized using known reinforcing agents, vulcanizing agents, vulcanization accelerators, and the like.

It will be apparent to those skilled in the art that various modifications and changes may be made in the foregoing disclosure without departing from the spirit and scope of our invention.

The following examples are submitted to illustrate preferred embodiments of our invention. The examples should not be considered in such a way as to unduly limit the scope of our invention. Microstructure and inherent viscosity determinations in the examples were made according to the procedure shown in U.S. 3,215,682. Mooney values were determined according to the procedure of ASTM D-1646-63.

EXAMPLE I

Butadiene was polymerized in a series of runs in the presence of an initiator system formed from nickel stearate, triethylaluminum, and molybdenum pentachloride. Variable amounts of molybdenum pentachloride were employed. The following recipe was used.

| | |
|---|---|
| 1,3-butadiene, parts by weight | 100 |
| Cyclohexane, parts by weight | 1560 |
| Nickel stearate, mhm. | 2 |
| Triethylaluminum (TEA), mhm. | 2 |
| Molybdenum pentachloride, mhm. | Variable |

Mhm.=gram millimoles per 100 grams monomer.

In each run the nickel stearate and triethylaluminum were reacted prior to being charged to the polymerization reactor. Nickel stearate was charged as a powder to the reactor and cyclohexane was added to form a suspension. The reactor was purged with nitrogen after which triethylaluminum dissolved in cyclohexane was introduced. The mixture was aged for about one hour at room temperature (about 76° F.).

When conducting the polymerization, cyclohexane was charged first after which the reactor was purged with nitrogen. Butadiene was added followed by the nickel stearate-triethylaluminum reaction mixture and then a suspension of molybdenum pentachloride in cyclohexane. The mixture was agitated for 17 hours and the temperature was maintained at 122° F. The reaction was short-stopped with a 10 weight percent solution of 2,2'-methylene-bis(4-methyl-6-tert-butylphenol) in a mixture of equal parts by volume of isopropyl alcohol and toluene. The polymers were coagulated in isopropyl alcohol, separated, and dried. All products were gel free. Results were as follows:

| Run No. | MoCl₅, mhm. | Conv., percent | Inherent viscosity | Microstructure, percent | | |
|---|---|---|---|---|---|---|
| | | | | Cis | Vinyl | Trans |
| 1 | 1 | 65 | 6.67 | 7.9 | 83.6 | 8.5 |
| 2 | 2 | 84 | 5.52 | 14.3 | 76.0 | 9.7 |
| 3 | 4 | 80 | 3.31 | 32.3 | 59.9 | 7.8 |
| 4 | 6 | 76 | 2.84 | 35.6 | 57.3 | 7.1 |
| 5 | 8 | 69 | 1.94 | 62.5 | 32.0 | 5.5 |
| 6 | 10 | 63 | 1.63 | 74.2 | 21.2 | 4.6 |
| 7 | 12 | 53 | 1.47 | 84.9 | 11.5 | 3.5 |

The data show that polymers ranging from 83.6 percent vinyl to 84.9 percent cis were obtained by varying the level of molybdenum pentachloride. The amount of preformed nickel stearate-triethylaluminum reaction product was held constant. As the molybdenum pentachloride level was increased, the cis content increased and the inherent viscosity decreased. There was much less variation in the trans content.

Attempts were made to polymerize butadiene in the presence of triethylaluminum and molybdenum pentachloride using 1.6 mhm. of each compound. Only a trace of insoluble polymer was formed. No polymerization resulted when nickel stearate and molybdenum pentachloride were employed using the same amounts of materials, i.e., 1.6 mhm. These results show that all three initiator components are needed to form an active catalyst for butadiene polymerization.

EXAMPLE II

Runs were conducted for the polymerization of butadiene in the presence of an initiator formed from nickel stearate, triethylaluminum, and molybdenum pentachloride. The recipe was similar to that of Example I except that the amount of triethylaluminum was 4 mhm. Molybdenum pentachloride was varied. Polymerization temperature was 122° F. and the time was 16 hours. Results were as follows:

| Run No. | MoCl₅, mhm. | Conv., percent | Inherent viscosity | Microstructure, percent | | |
|---|---|---|---|---|---|---|
| | | | | Cis | Vinyl | Trans |
| 1 | 1 | 60 | 4.08 | 5.7 | 82.1 | 12.2 |
| 2 | 4 | 62 | 3.37 | 10.2 | 80.3 | 9.5 |
| 3 | 8 | 81 | 2.86 | 25.9 | 62.7 | 11.4 |
| 4 | 12 | 90 | 2.40 | 33.7 | 56.6 | 9.7 |

These data show that the microstructure of the polymers varied as the molybdenum pentachloride level was varied. In this series a 1:2 mol ratio of Ni:Al was used instead of the 1:1 mol ratio used in Example I. In all cases the polymers were predominantly vinyl. Variation in the trans content of the polymers was small.

EXAMPLE III

A high vinyl polybutadiene cement was tested as an adhesive. The polymer was prepared in accordance with the following recipe:

| | |
|---|---|
| 1,3-butadiene, parts by weight | 100 |
| Cyclohexane, parts by weight | 1500 |
| Nickel stearate, mhm. | 1.6 |
| Triethylaluminum, mhm. | 3.2 |
| Molybdenum pentachloride, mhm. | 1.6 |
| Temperature, ° F. | 122 |
| Time, hours | 16 |

The procedure of Example I was followed. Polymers from five runs were blended. Properties of the blend were as follows:

Inherent viscosity _____ 6.5
Microstructure, percent—
  Cis _____ 9
  Trans _____ 9
  Vinyl _____ 82

A cyclohexane solution of the polymer (3.8 weight percent solids) was applied to 32-ounce cotton duck as a standard substrate in preparation for the 90° peel strength test as outlined in ASTM D–1876–61T. In preparing peel test specimens, the cement to be evaluated was spread on one surface of each of two plies of the test substrate at a wet film thickness of 0.020 inch. After each successive coating the cloth plies were allowed to air dry until the desired number of base coatings had been applied. Immediately after the final coating was applied, the two substrates were joined together and pressed under a loading of one pound per square inch for 8–12 hours. After this period the load was removed and the resulting two-ply laminates were air dried at room temperature for 24 hours prior to testing. Adhesive quantity in the bond area was determined by weight and reported as spread level in ounces per square foot of bond area.

Naphtha solutions (15 weight percent solids) of linear cis-polybutadiene (40 ML–4 at 212° F., 94.9% cis) and a branched polybutadiene (41 ML–4 at 212° F., 39.4% cis, 50.6% trans, 10.0% vinyl) were employed to prepare peel test specimens in the manner described above.

Peel tests were run in replicate series of five for each cement sample using 1-inch x 8-inch test strips cut from the two-ply laminate. Testing was performed at room temperature on an Instron Universal Tester at a jaw separation rate of 12 inches per minute to produce a peeling rate of 6 inches per minute in the sample test area. Peel strengths were reported as the average stress required to cause peeling failure of the bond line in pounds per inch of sample width (p.p.i.w.). Results were as follows:

| Rubber | Spread Level, oz./sq. ft. | Peel strength, p.p.i.w. |
|---|---|---|
| High vinyl polybutadiene | 1.02 | 5.6 |
| Cis-polybutadiene | 1.49 | 1.5 |
| Branched polybutadiene | 2.03 | 0.5 |

The data show that the high vinyl polybutadiene had the highest bond strength.

EXAMPLE IV 1,3-butadiene was polymerized utilizing the following recipe:

| | |
|---|---|
| 1,3-butadiene, parts by weight | 100 |
| Cyclohexane, parts by weight | 800 |
| Nickel stearate, mhm. | 2 |
| Triethylaluminum, mhm. | 2 |
| Molybdenum pentachloride, mhm. | 8 |

The polymerization procedure was the same as shown in Example I except that the reaction was allowed to continue for 24 hours. The conversion was 65 percent. The polymer had 47.8 percent cis, 5.4 percent trans, and 46.8 percent vinyl. The inherent viscosity of the polymer was 4.14. The polymer was then compounded in a conventional tread stock recipe as follows:

| | |
|---|---|
| Polybutadiene | 100 |
| Carbon black (high abrasion furnace) | 50 |
| Zinc oxide | 3 |
| Stearic acid | 2 |
| Flexamine [1] | 1 |
| Philrich 5 [2] | 10 |
| Sulfur | 1.75 |
| NOBS special [3] | 1.1 |

[1] Physical mixture containing 65% of a complex diarylamine-ketone reaction product and 35% of N,N′-diphenyl-p-phenylenediamine.
[2] Aromatic oil.
[3] N-oxydiethylene-2-benzothiazolesulfenamide.

The tread stock was milled at 110° F. and exhibited good milling properties. The compounded Mooney viscosity (ML–4 at 212° F.) was 69.8. The tread stock was then cured for 30 minutes at 307° F. The cured tread stock had the following properties:

Compression set, percent [1] _____ 18.8
300% modulus, p.s.i.[2] _____ 1715
Tensile, p.s.i.[2] _____ 2100
Elongation, percent [2] _____ 370
ΔT, ° F.[3] _____ 47.4

[1] ASTM D-395-61, Method B (modified). Compression devices are used with 0.325-inch spacers to give a static compression for the 0.5-inch pellet of 35 percent. Test was run for 2 hours at 212° F. plus relaxation for 1 hours at 212° F.
[2] ASTM D-412-62T.
[3] ASTM D-623-62.

The foregoing data illustrate a desirable balance of modulus, tensile, and elongation properties obtained when the polymer products of this invention are compounded in a conventional tread stock recipe. The data also illustrate a low heat build-up value. Conventional high cis-polybutadiene (a cis content of 95.5%) was compounded in a similar recipe as shown above and cured for 30 minutes at 307° F. The heat build-up value for the tread stock using the high cis-polybutadiene was 57.5.

We claim:

1. A catalyst composition which forms on mixing components comprising molybdenum pentachloride and a mixture of (1) lithium aluminum hydride or at least one organometallic compound having the formula $R_mAlCl_n$, $LiAlH_xR_{(4-x)}$ or $R_yM$ wherein R is an alkyl, cycloalkyl or aryl radical, or combination thereof, containing from 1 to 20 carbon atoms, $m$ and $n$ are integers of 1 or 2 such that $m+n$ is 3, $x$ is an integer of 0 to 3, M is lithium, sodium, potassium, rubidium, cesium, beryllium, magnesium, zinc, cadmium, aluminum, gallium or indium, and $y$ is an integer equal to the valence of the metal and (2) a nickel component selected from the group consisting of metallic nickel having a large surface area for its weight and a reducible nickel compound capable of being reduced by said lithium aluminum hydride or said organometallic compound wherein the ratio of said nickel component to said lithium aluminum hydride or said organometallic compound is in the range of 0.25 to 6 gram atoms of nickel per gram mol of lithium aluminum hydride or said organometallic compound, and the mol ratio of said molybdenum pentachloride to said lithium aluminum hydride or said organometallic compound is in the range of 0.1:1 to 25:1.

2. The composition of claim 1 wherein said nickel component is a nickel salt of a fatty acid containing up to 40 carbon atoms and said organometallic compound is a trialkylaluminum compound.

3. The composition of claim 2 wherein said nickel salt of a fatty acid is nickel stearate and said trialkylaluminum compound is triethylaluminum.

4. A process for controlling the molecular weight and the microstructure of a polybutadiene product comprising contacting 1,3-butadiene with the catalyst composition of claim 1 and varying the mole ratio of molybdenum pentachloride to said nickel component or to said lithium aluminum hydride or said organometallic compound by increasing or decreasing the amount of molybdenum pentachloride so as to provide a means for controlling the molecular weight and the microstructure of the polybutadiene product thereby produced wherein the level of said molybdenum pentachloride is increased to produce an increase in the mole ratio of said molybdenum pentachloride to said nickel component or to said lithium aluminum hydride or said organometallic compound so as to produce a decrease in the vinyl content, an increase in the cis content and a decrease in the inherent viscosity of said polybutadiene product or wherein the level of said molybdenum pentachloride is decreased to produce a decrease in the mole ratio of said molybdenum pentachloride to said nickel component or to said lithium aluminum hydride or said organometallic compound so as to produce an increase in the vinyl content, a decrease in the cis content, and an increase in the inherent viscosity of said polybutadiene product and wherein the ratio of said nickel component to said 1,3-butadiene is in the range of about .25 to 10 milligram atoms of nickel per 100 grams of 1,3-butadiene.

5. The process of claim 4 wherein said organometallic compound is a trialkylaluminum compound and said nickel component is a nickel salt of a fatty acid containing up to 40 carbon atoms.

6. The process of claim 5 wherein said trialkylaluminum compound is triethylaluminum and said nickel salt of a fatty acid is nickel stearate.

7. The process of claim 4 wherein the mole ratio of said molybdenum pentachloride to said lithium aluminum hydride or organometallic compound is varied in the range of 1:1 to 12:1.

8. A process for producing polybutadiene which comprises contacting butadiene with a catalyst formed by contacting, per one-hundred grams butadiene, 4 to 12 millimoles of molybdenum pentachloride, with the reaction product formed from contacting about 2 millimoles of triethylaluminum and about millimoles of nickel stearate, and receiving polybutadiene having a cis content within the range of 11.6 to 59.9 percent wherein said contacting to form said reaction product is conducted at a temperature in the range of about 20° to 70° C. for about 5 minutes to 25 hours.

References Cited

UNITED STATES PATENTS

| | | | |
|---|---|---|---|
| 3,058,963 | 10/1962 | Vandenburg | 260—88.2 |
| 3,067,188 | 12/1962 | Naylor | 260—94.3 |
| 3,084,148 | 4/1963 | Youngman | 260—94.3 |
| 3,118,865 | 1/1964 | Bruce | 260—93.7 |

FOREIGN PATENTS 647,006   8/1962   Canada.

PATRICK P. GARVIN, Primary Examiner

U.S. Cl. X.R.

252—429, 441

15916 (TDD)

UNITED STATES PATENT OFFICE

CERTIFICATE OF CORRECTION

Patent No. 3,480,608

Dated: Nov. 25, 1969

It is certified that error appears in the above-identified patent and that Letters Patent are hereby corrected as shown below:

Patent Claim 8 (originally Claim 17, line 5), Col. 8, line 38 after "about", insert --- 2 ---;

Patent Claim 8 (originally Claim 17, line 5), Col. 8, line 39

"receiving" should be --- recovering ---.

SIGNED AND
SEALED
JAN 26 1971

(SEAL)
Attest:

Edward M. Fletcher, Jr.
Attesting Officer

WILLIAM E. SCHUYLER, JR.
Commissioner of Patents